April 18, 1967
G. L. HAMMON
3,314,667
MACHINE TORCHES
Original Filed Nov. 19, 1963
3 Sheets-Sheet 1
Fig_1
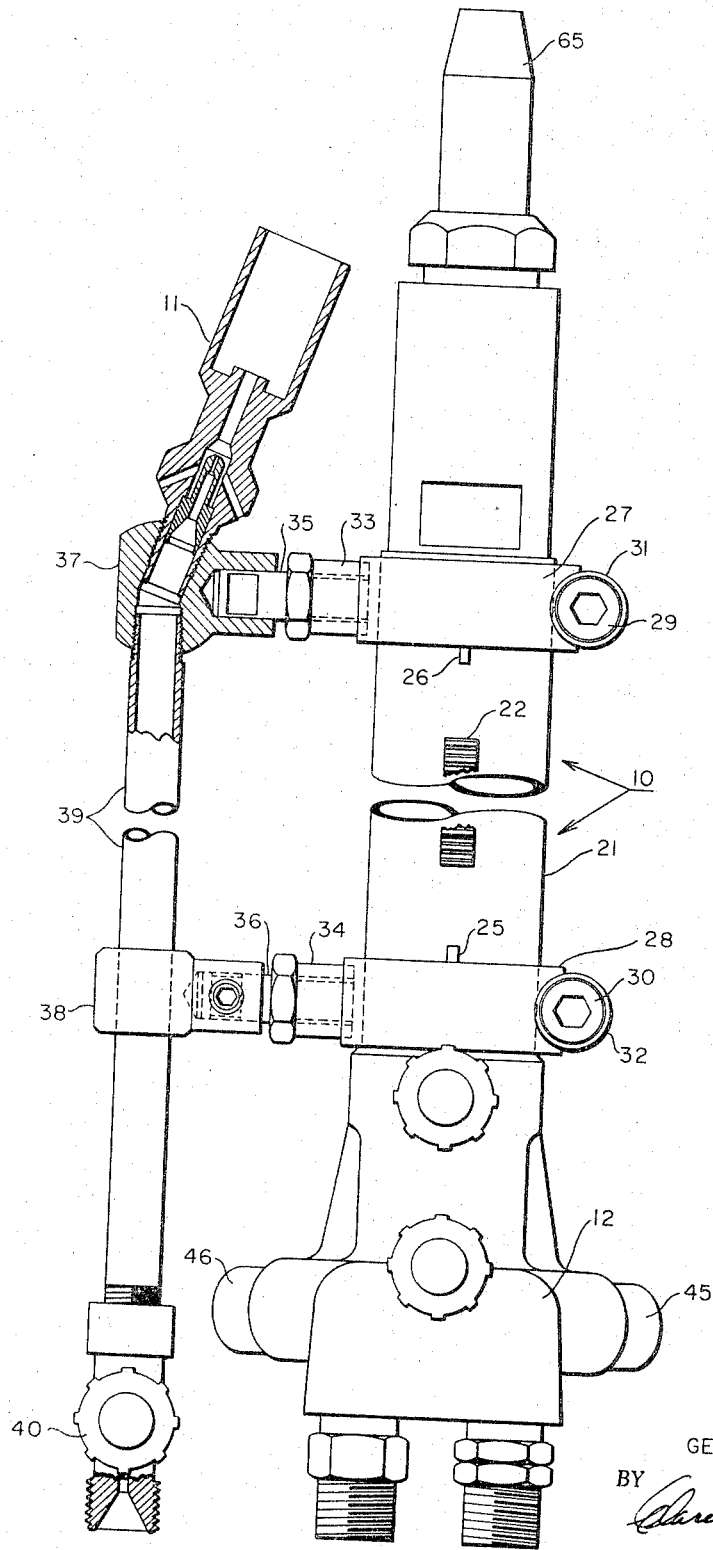
INVENTOR.
GEORGE L. HAMMON
BY
Clarence W. Martin

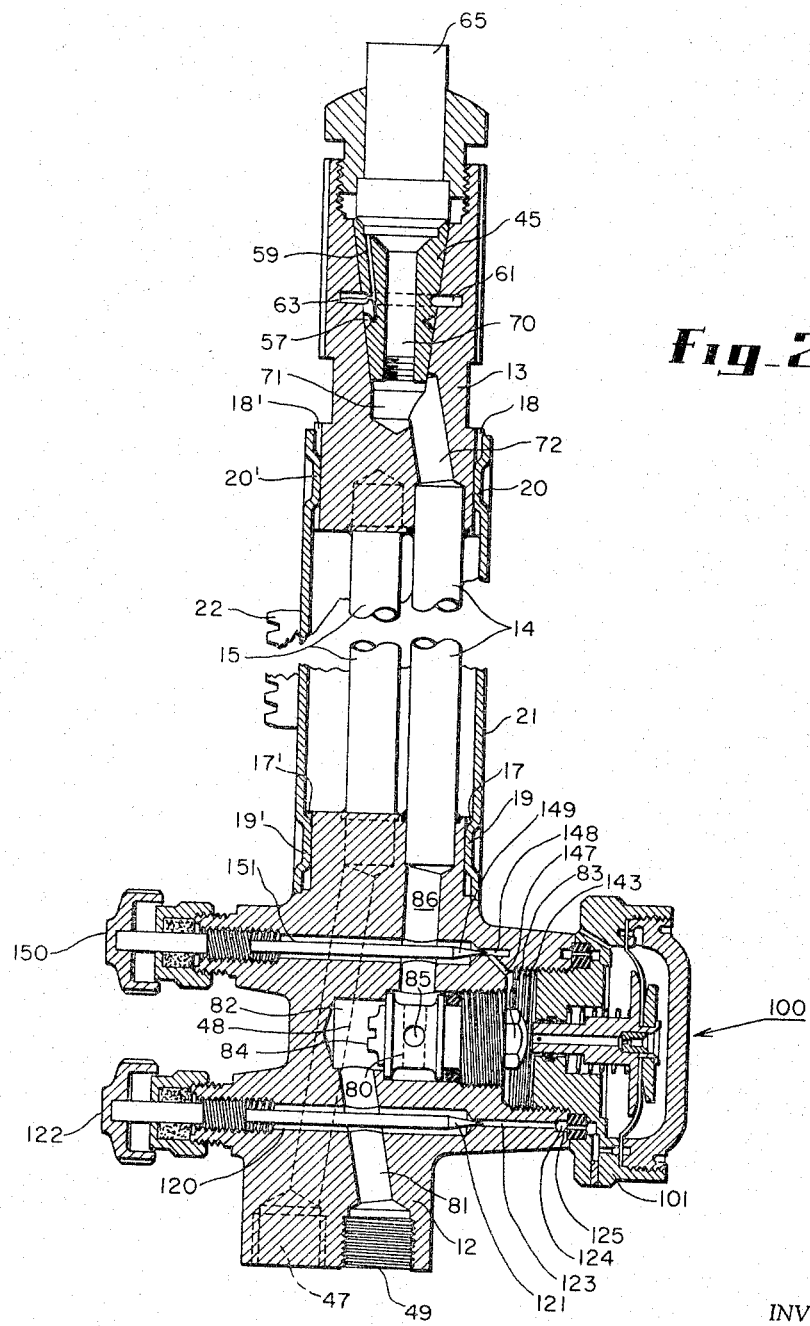
Fig_2
INVENTOR.
GEORGE L. HAMMON
BY Clarence W. Martin

April 18, 1967 G. L. HAMMON 3,314,667
MACHINE TORCHES
Original Filed Nov. 19, 1963 3 Sheets-Sheet 3
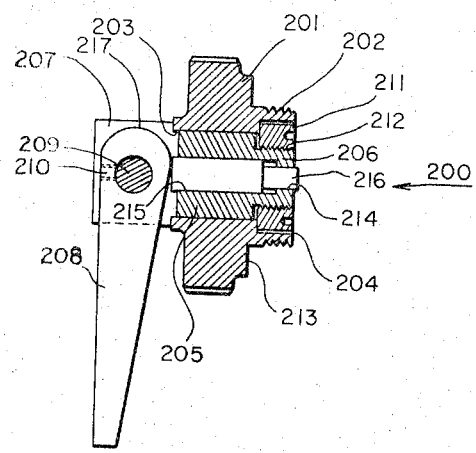
Fig_3_
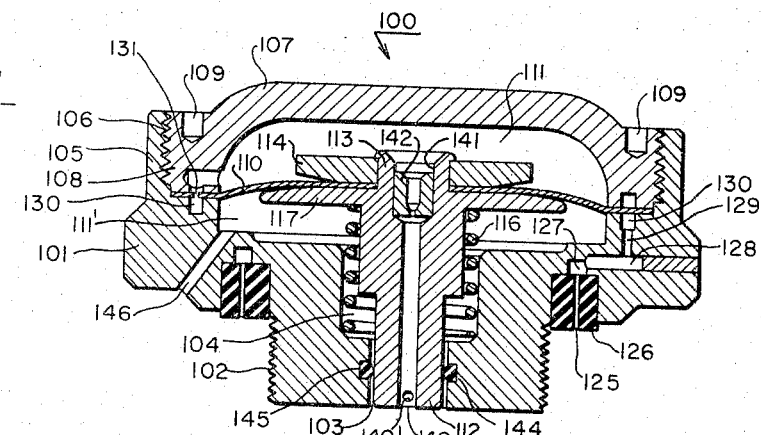
Fig_4_
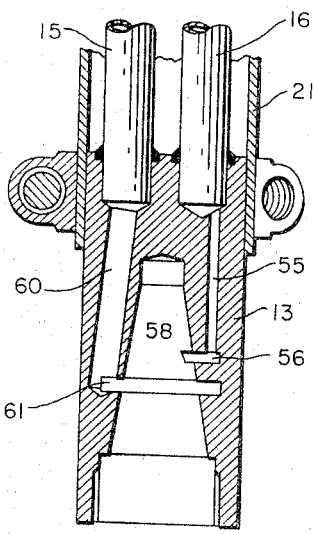
Fig_5_
INVENTOR.
GEORGE L. HAMMON
BY Clarence W. Martin

3,314,667
MACHINE TORCHES
George L. Hammon, Oakland, Calif., assignor to Hammon Precision Equipment Company, Oakland, Calif., a corporation of California
Original application Nov. 19, 1963, Ser. No. 324,811, now Patent No. 3,258,242, dated June 28, 1966. Divided and this application Jan. 15, 1965, Ser. No. 425,899
1 Claim. (Cl. 266—23)

The invention relates to machine torches for cutting metals and more particularly concerns interchangeable racks on the torches wherein the torches are driven towards and from the workpiece by means of rack and pinion drives whereby the torch may be used with a plurality of different pinion drive mechanisms and in different machine torch mechanisms.

This application is a division of my U.S. application Ser. No. 324,811, filed Nov. 19, 1963, now Patent No. 3,258,242.

It is therefore a main object to provide a machine cutting torch of such construction that the gear racks, provided for moving the torches up and down relative to the workpiece, may be interchanged to meet existing requirements without otherwise changing the torch.

Another object is to provide a machine torch in which gear racks are rotatable to different positions on the torch.

Another object is to provide means for rotatably adjusting a pilot torch on the main torch and to adjustably space the same relative to the main torch in any one of a plurality of positions thereof required to meet existing working conditions.

Other objects and advantages will become apparent from the following detailed description when read in conjunction with the drawing, given by way of example only, and in which:

FIGURE 1 is a plan view, partially in section, of the cutting torch with a pilot flame torch attached thereon;

FIGURE 2 is a view, partially in section, of the main body of the torch and an automatically operable valve for controlling the cutting oxygen supply;

FIGURE 3 is a view, partially in section, of a manually operable means which is interchangeable with the automatically operable control means;

FIGURE 4 is a detailed view, in section, of the automatically operable valve control means; and FIGURE 5 is a view, in section, of a portion of the torch body which receives a heating and burning tip.

A main heating and cutting torch is generally indicated at 10 in FIGURE 1 with a pilot torch 11 attached thereto. A main body portion comprises a valve housing block 12 (FIGURE 2), a gas mixer housing block 13 and three gas transmitting tubes such as tubes 14 and 15 connected between the two housing blocks to form an integral unit. A third tube, hidden behind tube 14 in FIGURE 2 is shown at 16 in FIGURE 5.

The housing blocks 12 and 13 (FIGURE 2) each have a pair of diametrically opposed slots, 17, 17' and 18, 18' formed therein adapted to receive lugs 19, 19' and 20, 20' respectively, formed in a protective sleeve 21 upon which is fixed a gear rack 22 (FIGURE 1). The gear rack forms a portion of a conventional mechanism for controlling the up and down movement of the torch relative to the material which is to be cut by the torch. It will be noted that the lugs 19, 19', 20, 20' (FIGURE 2) are freely slidable upwardly to the extent that the lugs 20, 20' are aligned with a circumferential recess in block 13 and lugs 19, 19' are disengaged from slots 17, 17' of block 12. In this disengaged position, the sleeve 21 may be rotated 180 degrees to a second position. Obviously, a plurality of opposed slots similar to slots 17, 17' and 18, 18' may be provided for a plurality of adjusted positions of the sleeve 21 relative to the blocks 12 and 13. Thus if only one gear rack is provided, it may be rotated to different positions to engage a drive pinion which, on different machine torch drives, may be located at different positions; alternatively, if several racks of different gear tooth pitch are provided on the sleeve the same torch may be used in any one of a plurality of torch cutting machines having drive gear pinions of different pitch.

Slots 25 and 26 (FIGURE 1) are cut in opposite ends of sleeve 21, the slots also being cut in the diametrically opposed walls (not shown) of the sleeve. As described shortly hereinafter, clamps are provided over the sleeve 21 near the opposite ends thereof and over the slots 25, 26 to hold the sleeve on the housing blocks 12 and 13, the slots providing for compression of the sleeve by the clamps. Clamps 27 and 28 are provided with binding screws 29 and 30, respectively, to detachably fix the sleeve on the torch body, the screws extending through threaded bosses 31 and 32 on the clamps.

Each clamp 27 and 28 carries a respective internally threaded post 33, 34, adapted to receive a screw 35, 36 and which screws are locked by nuts as shown. The opposite ends of the screws are inserted and locked into supports 37 and 38 for the pilot flame torch body 39 and tip 11. A manually controlled valve 40 is provided for controlling the flow of gas to the torch 11, the latter being of conventional construction and purpose. From the foregoing it will be apparent that the sleeve 21 and rack 22 are adjustable to selected positions relative to the torch body and that the sleeve is locked in place by clamps, adjustable on the sleeve to support the pilot flame torch in any selected position relative to the torch body and rack. This arrangement provides utmost flexibility in adapting the torch to varied forms of existing torch machinery equipment.

The torch block 13 (FIGURE 2) carries a gas mixing unit 45 which is of conventional construction, reference being had to my patent application Ser. No. 189,484, filed Apr. 23, 1962, now Patent No. 3,192,987, for a more complete description of such a mixing unit.

Oxygen and acetylene gases are supplied through tubes 15 and 16 respectively, as shown in FIGURE 5 to block 13, the tubes being brazed to the block and the supply of gases being controlled by a pair of conventional manually controlled valve knobs 46 and 46' (FIGURE 1). For purposes of clarity, the manually controlled valve knobs have been omitted from FIGURE 2; however, the block 12 has an inlet opening 47 to which a supply of acetylene is connected for transmission through a passageway 48 to tube 15. The supply of acetylene in passageway 48 is determined by conventional needle valve (not shown), the valve being under control of the previously mentioned knob 46. Similar means, including knob 46', are provided to control the flow of oxygen to tube 16, the oxygen inlet opening being hidden below another (burner oxygen supply) opening 49, described in full hereinafter. Since the control of the acetylene and oxygen gases to the mixing unit 45, for purposes of heating the object to be burned, is conventional further description of the valves is believed unnecessary, it being noted that the valves could be provided externally of the present torch if so desired.

Referring to FIGURE 5, a controlled supply of oxygen is transmitted through tube 16 to a passageway 55 in the block 13. From passageway 55, oxygen flows through another passageway 56 to an annular passageway 57 (FIGURE 2) formed in part by a recess in the gas mixing unit 45 and the interior wall of a cavity 58 (FIGURE 5) in the block 13. The oxygen then flows through tubes 59 (FIGURE 2) in the mixing unit. Meanwhile, acetylene is transmitted through tube 15 (FIGURE 5) and through passageways 60, 61 to the mixing unit 45 (FIGURE 2), the latter having aspirating tubes 63 opening into the previously mentioned oxygen tubes 59. Acetylene is drawn into tubes 59 and mixed therewith as described in the previously mentioned patent to produce a gas mixture which is transmitted to a combination heating and burning tip, the mixed gasses flowing through passageways separate from the burning gas and, when ignited, producing a heating flame in conventional manner.

The mixing unit 45 has a central opening 70, one end of which opening stands adjacent a chamber 71 in block 13. Oxygen, under controlled pressure, described hereinafter, flows through tube 14 to a passageway 72, through chamber 71 and opening 70. The end of opening 70 is in gas tight communication with a central opening in tip 65. When the object to be cut is heated by the burning of the previously described mixture of oxygen and acetylene, oxygen is fed through the central opening of the mixer unit and the tip to burn the object and cut therethrough by known oxidizing action. The means for controlling the supply of burning oxygen, described next, is claimed in the parent application S.N. 324,811.

The previously mentioned opening 49 in block 12 receives oxygen under high pressure from a supply line which may feed a plurality of torches of the presently described type. When the torches are used simultaneously to machine-cut a plurality of objects, the supply of burning oxygen simultaneously to all torches previously has caused two problems: (1) the burning action of the torches has been sequential, rather than simultaneous due to the drop in pressure in the supply line, thus causing dishing or undesirable opening of the initial cut, of one or more objects being cut, and (2) it has been impossible to begin the operation of the mechanism for advancing the torches at a pre-determined time after opening the main oxygen supply line, due to the indefinite drop in pressure, described above.

The present invention overcomes these difficulties by providing a novel gas pressure regulated valve on each torch which is opened slowly at a pre-determined rate and which prevents both the above described dishing action and sudden drop in line pressure.

A valve, generally indicated at 80 (FIGURE 2) controls the flow of oxygen between inlet 49 and the tube 14. Valve 80 is a self contained unit threaded into block 13 and is similar to the valve 40 shown in my Patent No. 3,045,694 issued July 24, 1962. Briefly, gas tends to flow through opening 49 and a passageway 81 in block 12 to a chamber 82; however, the valve 80 normally prevents the flow of gas until a valve button 83 is depressed. At such time gas flows over valve head 84 into the valve and out of a hole 85 in the valve body. From hole 85 gas flows through a passageway 86 and into tube 14 to cause a burning action, previously described.

Valve button 83 is depressed by the control of a gas regulated mechanism comprising a self-contained unit generally indicated at 100 (FIGURES 2 and 4). The unit may be inserted or removed as a whole in case it is preferred to use an alternative manual control unit, described hereinafter.

Unit 100 comprises a main body 101 having a reduced portion threaded as at 102 and adapted to be screwed into internal threads in the torch body 12. A central bore 103 and a cavity 104 are formed in body 101. An upper extension 105 is internally threaded as at 106 to receive a cap 107, threaded at 108. Holes 109 in cap 107 receive lugs (not shown) of a cap tightening tool to lock the cap tightly against the outside edges of a circular diaphragm 110 made of plastic material or the like. Thus, a chamber formed between the body 101 and cap 107 is divided into two chambers 111 and 111' by the diaphragm. An actuating device 112, generally having the shape of a T in section, has an upper extension 113 which protrudes through an appropriate sized hole in the diaphragm. A circular backing plate 114 lies adjacent the opposite side of the diaphragm and the upper end of the extension 113 is die riveted over the backing plate to produce a tight seal between the diaphragm 110, the actuating device 112 and the backing plate 114.

The bottom of the actuating device stands over and closely adjacent the valve button 83 and, as described hereinafter, is moved to open the valve by a predetermined amount; however, a spring 116 having one end seated in the bottom of chamber 104 and the other end lying against the T shaped arm 117 normally holds the actuating device 112 away from the valve button.

Referring to FIGURE 2, a passageway 120 is formed in body 12, and which passageway intersects the oxygen passageway 81. A manually controlled needle valve, comprising a needle 121 and a knob 122, is provided to prevent or to permit the flow of oxygen through a passageway 123 in body 12. Passageway 123 terminates in an annular recess 124, the recess transmitting gas to a hole 125 in a sealing gasket 126 (FIGURE 4) located between body 12 and body 101. Oxygen flows through hole 125, annular chamber 127 in body 101, and therefrom through holes 128, and 129 into an annular chamber 130 formed in body 101. A hole 131 in the diaphragm transmits oxygen to chamber 111 and, under pressure, tends to move diaphragm 110 and the actuating device 112 in such manner as to depress the gas valve button 83 (FIGURE 2) to a full open position; however, the following means are provided to control the exact amount to which the button is to be depressed.

The T shaped actuating device 112 (FIGURE 4) has a central bleeder bore 140 and an enlarged bleeder bore 141 cut therein. A porous gas filter 142 in bore 141 permits oxygen to flow through bore 140 and transverse bores 140' into a chamber 143 (FIG. 2) formed in body 12 beneath the diaphragm valve body 101. An O ring 144 (FIGURE 4), located in an annular recess 145 of body 101, is compressed by the actuating device 112 to provide a gas tight seal between the chamber 143 (FIGURE 2) and chamber 104 (FIGURE 4). In case the O ring 144 should leak, a counterbalancing pressure would build up beneath under side of the diaphragm 110; therefore, a vent hole 146 is drilled in body 101 to prevent the buildup of such a pressure. Passageways 147 and 148 (FIGURE 2) permit the oxygen to flow from chamber 143 through a needle valve 149 controlled by knob 150. Oxygen then flows into a passageway 151 which intersects the previously described passageway 86.

From the foregoing description it will be seen that the self contained unit 100 is operable under control of valve knobs 122 and 150 to open the oxygen valve 80. In operation, the knob 122 may be opened to a full position while knob 150 is adjusted to determine the amount of gas that is bled from the pressure control unit 100. In this manner the oxygen cutting action of the torch, or plurality of torches, may be predetermined. When a plurality of torches is used to cut identical patterns, the knobs 150 are pre-adjusted so that each torch cuts in the same manner as the other torches. Furthermore, when the main supply line valve is opened, the valves 80 are opened slowly under the control of the units 100 so that there is no appreciable pressure drop at any valve and no dishing occurs. Also, since the lead time of the valves is predetermined, automatically operable means may be used to start the cutting advance of the torches a predetermined length of time after the main supply line is opened.

If conditions should arise where it is desirable to operate the valve 80 manually, the following mechanism is provided which is interchangeable with the unit 100. Assume first that unit 100 is unscrewed from body 12 and that the unit 200 (FIGURE 3) is inserted in place of unit 100. Unit 200 comprises a main body portion 201 threaded at 202 for purposes of being threaded into the body 12. Bores 203 and 204 extend through body 200 as shown. Bore 203 receives a cylinder 205 the rightmost end of which is of reduced diameter and threaded as at 206. The leftmost end 207 of cylinder 205 is of enlarged diameter and has a slot cut therethrough to form two extensions 207 which receive a handle 208 therebetween. Handle 208 is pivoted on a nylon shaft 209 carried by extensions 207. A lock screw 210 in handle 208 holds the handle on the pivot and prevents endwise movement of the pivot. A large cylinder 211 having internal threads 212 is tightly screwed onto cylinder 205 to form an integral unit which is laterally fixed relative to body 201 but which may be freely rotated therein.

Cylinder 205 has a pair of bores 214 and 215 cut therein to receive a nylon actuating pin 216 and which pin stands opposite the button 83 of valve 80. During the operation of the torch under the control of the manually operable unit 200, the valves 122 and 150 are closed, and the valve 80 (FIGURE 2) is operated under control of the handle 208. When the handle 208 is rotated clockwise from the position shown, a camming surface 217 depresses the actuating pin 216 and opens the valve 80.

Since the torch is adaptable for use upon different types of multiple torch cutting machines, the possibility arises that if a handle such as handle 208 were limited to a single plane of operation, it might be obstructed from opening or closing in any position in which the axis of the pivot 209 is fixed; however, since the cylinders 205 and 211 are freely rotatable within the body 201, it will be noted the assembly comprising the cylinders, the handle, and the pivot thereof, are rotatable as a unit to permit the handle to stand clear of any obstruction otherwise presented to the free operation of the handle.

From the foregoing description it will be apparent that the torch of the present invention presents many advantages over previously known torches. Since the gear rack thereon may be set in different positions on the torch or replaced by a sleeve having a different pitch gear rack, the torch is adaptable to a wide variety of torch cutting machines, thus affording economy of operation and a saving in time of setup.

I claim:

A machine torch having a main body portion, a sleeve rotatively mounted on said body portion and having a gear rack fixed thereon, means for detachably fixing said sleeve in any one of a plurality of selected rotated positions on said body portion, a pair of brackets rotatably mounted on said sleeve, means for fixing the brackets in any one of a plurality of rotated positions on said sleeve, each bracket carrying a threaded boss, a screw being threaded into said boss and having a lock nut thereon to fix the screw in any adjusted position relative to the boss, and means for attaching a pilot flame torch to the screws whereby the pilot flame torch may be adjusted to different rotated positions and in different spaced positions relative to the machine torch.

References Cited by the Examiner

UNITED STATES PATENTS

| 255,011 | 3/1882 | Norton | 82—5.5 |
| 1,864,889 | 6/1932 | Brown et al. | 82—1.4 |
| 1,915,915 | 6/1933 | Anderson | 266—23 |
| 3,071,360 | 1/1963 | Scarince | 266—23 |

FOREIGN PATENTS

| 168,275 | 5/1951 | Germany. |
| 1,113,350 | 8/1961 | Germany. |

JOHN F. CAMPBELL, *Primary Examiner.*

WHITMORE A. WILTZ, *Examiner.*

M. L. FAIGUS, *Assistant Examiner.*